R. GOLDSCHMIDT.
APPARATUS FOR PRODUCING HIGH FREQUENCY CURRENTS.
APPLICATION FILED AUG. 26, 1908.
999,987.
Patented Aug. 8, 1911.
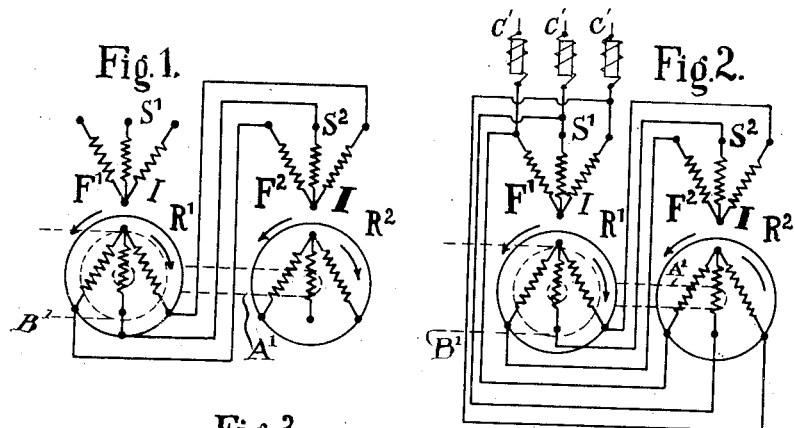
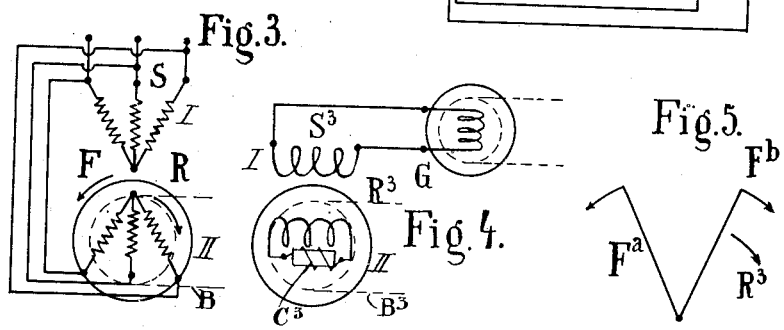
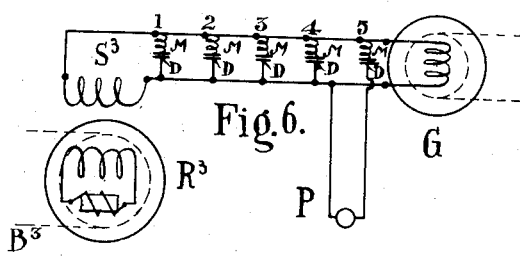
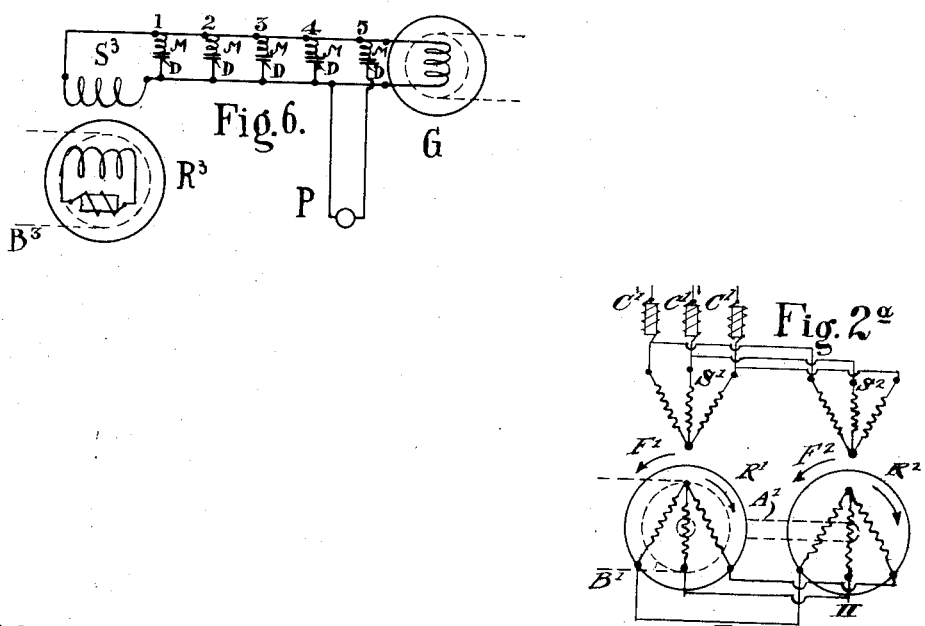
Witnesses:
C. H. Crawford
E. Schallinger
Inventor:
Rudolf Goldschmidt
by B. Singer
Attorney

UNITED STATES PATENT OFFICE.

RUDOLF GOLDSCHMIDT, OF DARMSTADT, GERMANY.

APPARATUS FOR PRODUCING HIGH-FREQUENCY CURRENTS.

999,987. Specification of Letters Patent. Patented Aug. 8, 1911.

Application filed August 26, 1908. Serial No. 450,389.

*To all whom it may concern:*

Be it known that I, RUDOLF GOLDSCHMIDT, a citizen of the Empire of Germany, residing at Darmstadt, in the Empire of Germany, have invented a new and useful Apparatus for Producing High-Frequency Currents, of which the following is a specification.

My invention relates to a novel apparatus for producing high frequency currents, more particularly for the wireless telegraphy or for the signaling by means of tuned waves.

I will now proceed to describe my invention with reference to the accompanying drawing, in which—

Figure 1 is a diagram to illustrate the known method of producing high frequency currents in several (here two) stages, in order to better show the difference between this figure and the following one. Fig. 2 is a diagram to illustrate the original principle of my invention, according to which the high frequency currents produced in the second machine are returned to the orginal magnetic field, Fig. 2ᵃ is a modification of Fig. 2 and will be referred to later on, Fig. 3 is the same, as Fig. 2, only that the two rotors and the two stators are respectively made in one, Fig. 4 is the same as Fig. 3, only that the energy is returned not in the electrical way as in Fig. 3, but in the magnetical way, Fig. 5 is a diagram which will be referred to later on, Fig. 6 shows, how currents of various higher frequencies produced according to Fig. 4 can be made use of.

Similar letters of reference refer to similar parts throughout the several views.

When in an ordinary single-phase or polyphase induction machine I in Fig. 1 the rotor $R^1$ is driven (by a belt $B^1$ or the like shown in dotted lines for the sake of clearness) at a synchronous speed in a direction opposite to that of the rotating field $F^1$, of course the frequency of the currents produced in the rotor will be double that of the stator current. The reason for this known fact is that the speed of the rotating field in relation to the "rearward" rotating rotor is double its speed in relation to the stator $S^1$ (see Fig. 1). If now we pass the current produced in the rotor $R^1$ through the stator $S^2$ of a second multiphase induction machine II (Fig. 1) and drive the rotor $R^2$ of this machine equally "rearward" that is in a direction opposite to that of the rotating field $F^2$, of course the frequency in the second rotor $R^2$ will be still higher than that in the first rotor $R^1$. If the two machines are made alike and coupled together directly, say by means of a shaft $A^1$ or otherwise, then, when assuming the frequency of the current in stator $S^1$ to be 1000 periods, the frequency in the rotor $R^1$ and the stator $S^2$ will be 2000 periods and the frequency in the rotor $R^2$ 3000 periods. By mechanically and electrically coupling several such machines currents of any high frequency can be produced. The method of transforming the frequency by means of a cascade connection and an armature rotating at a speed different from that of the rotating field is known, but it is not possible to at once produce by these means the high frequency currents such as are employed in the wireless telegraphy, since a great number of frequency transformations would be necessary.

The employment of the method indicated above for the purposes of the wireless telegraphy and in general for the purposes of the signaling by means of tuned waves, of the controlling of distant switches, etc., is rendered possible only by an essential simplification of the plan of connections, in fact of the whole system. For this purpose the current obtained from the rotor $R^2$ is returned to the stator $S^1$ (see Fig. 2) by conductors leading to the same winding which is used for the current of 1000 periods. The latter winding is quite capable of conducting two currents of different frequencies, and two rotating fields can be superposed in the first machine I without disturbing one another. Some protecting device, such as for example choking coils C' C' C' (Fig. 2), is of course necessary so that only an insignificant part of the current of 3000 periods passes through the initial source of the current of 1000 periods. The current of 3000 periods produces in the stator $S^1$ a very rapidly rotating field which in turn produces currents of 4000 periods in the rotor $R^1$, which currents by the transformation from the stator $S^2$ to the rotor $R^2$ are turned into currents of 5000 periods. The latter currents again pass back to the stator $S^1$ and are transformed into currents of a still higher frequency, so that at last currents of an infinitely high frequency are produced. When the primary part of the second machine is made to rotate, the rotating parts can be connected directly without any collecting rings and brushes as is shown at Fig. 2ª. Then also cage rotors can be used.

The second machine may be dispensed with and a single machine can be employed. It is only necessary to electrically connect its rotor with its stator, so that the currents of high frequency produced in the rotor pass back to the stator to be again transformed (Fig. 3). Of course also currents circulating in the main conductors can find their way to the rotor R and will be then turned into high frequency currents. These currents can either be permitted to circulate or be choked by means of tuning devices. The rotor R is shown as arranged to be driven by means of a belt B.

Instead of obtaining the energy by electrical derivation from the rotor and returning it to the stator, and vice versa, this return may also take place after a transformation in the machine itself, whereby the advantage will be obtained, that no electrical connection (circuit) need exist between the stator and the rotor. This is effected in the following manner. The induction machine is provided with a rotor having a single-phase winding, and its stator is also provided with a single-phase winding, in case currents of a higher frequency are to be produced. I call " single-phase winding " a winding which forms a single circuit or several electrically equivalent parallel circuits, so that a rotating field can produce only single-phase electromotive forces in this winding. An ordinary two-phase winding, in which a phase is interrupted, becomes a single-phase winding. Also the single-phase winding may be regarded as the resultant of two rotatory current windings (Fig. 2). In the present case the single-phase winding of the rotor $R^3$ can be closed upon itself (Fig. 4), if necessary by the insertion of a choking coil $C^3$, a condenser or the like. Let the rotor $R^3$ (driven by a belt $B^3$ or the like) run at a synchronous speed. If we now pass an alternating current of 1000 periods through the winding of the stator $S^3$ (Fig. 4), an alternating magnetic field will be produced, the inducing effect of which upon the rotor $R^3$ is equal to that of two rotating fields running at a like (synchronous) speed in opposite directions, as is known. I call these two rotating fields $F^a$ and $F^b$ (Fig. 5) and assume the rotor $R^3$ to rotate at the same speed and in the same direction as the rotating field $F^b$, then the relative velocity of the rotor $R^3$ with regard to the field $F^b$ will be *nil*, but the other field $F^a$ will rotate at double the speed of the rotor $R^3$ and in a direction opposite to that of the latter and will produce in the rotor $R^3$ a current the frequency of which is double that of the current supplied to the stator $S^3$. This current of the double frequency passes through the single-phase winding of the rotor $R^3$ and produces in the latter an alternating magnetic field, which can be thought to be divided into two rotating fields, one of which rotates at the double synchronous speed in a direction opposite to that of the rotor $R^3$ so that it has the single synchronous speed in relation to the stator $S^3$ and produces in the latter electromotive forces of the same frequency as those produced in the generator G (Fig. 4). The said second rotating field as a component and having the double synchronous speed in relation to the rotor $R^3$ and rotating in the same direction as the latter has therefore the triple synchronous speed in relation to the stator $S^3$ and produces therein electromotive forces of a frequency triple that of the original current supplied to the machine. The electromotive forces of the triple frequency produce currents which circulate in the stator $S^3$, the generator G and the circuit between them or a shunt artificially formed (Fig. 6), the said shunt comprising a choking coil B and a condenser D or the like. This current of the triple frequency is again transformed by producing in the rotor $R^3$ a current of the quadruple frequency, which again acts upon the stator $S^3$ whereby a current of the quintuple frequency is produced. In this manner currents of an infinitely high frequency could be produced by automatic transformation.

The arrangements shown in Figs. 3 and 4, although apparently different, are identical in their principle. In both cases two windings move relatively to each other, a primary and a secondary winding. In Fig. 3 the winding I is always the primary winding, II is always the secondary winding. If for instance a current of 1000 periods is in I, 2000 periods may be taken from II; these 2000 periods are sent back again into I so that I is always primary and II is always secondary. In Fig. 4 a current of 1000 periods is sent into the winding I as the primary winding, 2000 periods are induced in II, the secondary winding. This current is now not sent back again into I as in Fig. 3, but it is short circuited in itself, by condensers and choke-coils, respectively. II therefore becomes a primary winding and induces a current of 3000 periods in I as secondary winding. In both cases we have the relative movement of two windings to each other, or to express it in electrical terms, periodical change of the induction in both windings and at the same time utilization of these moved windings for gradually step by step increasing the frequency. In the ordinary alternating current generators or motors we have also a relative movement of two windings one of which is energized by direct current or by alternating current. In these known constructions the generation or transformation of alternating current is obtained in the first step. The real subject matter of this invention is based on the conception that a multiple transformation of the frequency may be obtained in this process.

It is by no means necessary, that the machine should run synchronously. At any other speed the proportion of the frequency transformation need not be necessarily an integral number.

With this method of frequency transformation, that is with the single-phase machine having a single-phase rotor no mechanical driving gear is necessary, since the single-phase machine can in known manners be made to rotate synchronously or nearly so.

If the machine is driven with an external power, the generator of alternating current can be omitted and a source of direct current (that is an alternating current of the frequency *nil* can be inserted for exciting the stator.

It is to be noted, that it is characteristic of my invention, that no over-oscillations, such as are accidentally found with other alternating current machines and arise from various reasons, are produced, but that in the series of stages of transformation actually the whole energy of the lower frequency is transformed at each stage into one of the next higher frequency, the unavoidable losses being disregarded. Owing to the repeated transformation the drop of potential in consequence of the self-induction of the windings (magnetic leakage) will be very considerable, so that the currents of very high frequency become most weak. This can be counteracted by the insertion of condensers in the stator or rotor or by their connection in multiple with the machine. The best effect would seem to be produced by a combination of condensers and choking coils which are in resonance for the different frequencies, regard being had to the self-induction of the machine. Fig. 6 illustrates such an arrangement. Groups 1, 2, 3, 4, . . . of choking coils M and condensers D are connected in multiple with the generator G and the machine S³ R³. If the self-induction of the machine is insignificant, the group 1 is so proportioned as to show a resonance about at the triple of the original frequency, the inductive and capacity resistances being *nil*, so that the current of this frequency coming from the machine can readily pass over group 1. In a similar manner the group 2 should be made to show a resonance at the quintuple frequency, the group 3 at seven times the original frequency. In general the choking coils M and condensers D need be only very small, since the frequency is very high. By connecting an apparatus P to be supplied with a current of a certain frequency in series or partially in multiple with the corresponding group (group 5 in Fig. 6) a current of any desired frequency can be obtained from the machine and used for distant connections and the like. Of course the apparatus intended to consume the high frequency current may be turned to a certain frequency.

The groups of condensers D and choking coils M need not all be connected in multiple. Mixed connections in series and in multiple, also bridge connections or other connections may be employed. The apparatus and groups of condensers D and choking coils M may be connected with the circuit of the rotor instead of with the circuit of the stator. In all cases of course the rotor and the stator may exchange their parts, that is to say the rotor or the stator may be made the primary or secondary part and vice versa.

For the production of very high frequencies, particularly for the wireless telegraphy, it may be found necessary to construct the machine without iron. The windings may be wound on or disposed near parts of non-magnetic or weakly magnetic material or they may be disposed in the air. In this case the stator and rotor windings may under circumstances contract and form a single wire loop or a single wire.

In Figs. 2, 3, 4 and 6 only a number of tuning devices, such as choking coils M condensers D, etc., is required for eliminating by means of the different frequencies of the superposed current waves which harmonize with the resonance. In general for each frequency stage a separate device of this kind must be employed. At the most one stage may be left without any such device as trials have shown.

I claim:

1. A frequency converting apparatus comprising stator and rotor members provided with windings having mutually inductive relation, means for supplying an exciting current to produce a magnetic field in one of said members, means for rotating said rotor thereby inducing currents of higher frequency in the other member, means for transferring the energy of the last named currents to the inducing member and causing an inductive field of said higher frequency to react upon the induced member to thereby produce currents of still higher frequency, the reactions thus effecting an increase of frequency of the initial exciting currents.

2. A frequency converting apparatus comprising stator and rotor members provided with windings having mutually inductive relation, means for supplying an exciting current to produce a magnetic field in one of said members, means for rotating said rotor thereby inducing currents of higher frequency in the other member, means for transferring the enegy of the last named currents to the inducing member and causing an inductive field of said higher frequency to react upon the induced member to thereby produce currents of still higher frequency, the reactions thus effecting an increase of frequency of the initial exciting currents, and resonance devices for tuning being provided in circuit with one of said windings and permitting passage of currents of several frequencies.

3. The combination with a generator of alternating currents of a certain frequency, of a frequency changer comprising rotor and stator members having interrelated windings, an exciting circuit connecting said generator and the winding of one member to excite an alternating field therein, means for rotating said rotor, thereby inducing currents of a higher frequency in the other member which will in turn induce currents of a corresponding frequency in the inducing winding, the interactions between the windings effecting a multiplication of the frequency of the exciting current, resonance devices connected in circuit with one of said windings each permitting the passage of currents of a certain frequency, and a translating device in the circuit with one of the resonance devices.

4. A frequency converting apparatus comprising stator and rotor members having interrelated windings, means for exciting a magnetic field in one of said members, means for rotating said rotor, thereby inducing currents of a certain frequency in the other member which in turn will produce currents of a corresponding frequency in the inducing winding, the interactions between the stator and rotor windings thus effecting a multiplication of the frequency originally had.

5. A frequency converting apparatus comprising stator and rotor members having interrelated windings, means for exciting a magnetic field in one of said members, means for rotating said rotor, thereby inducing currents of a certain frequency in the other member which in turn will produce currents of a corresponding frequency in the inducing winding, the interactions between the stator and rotor windings thus effecting a multiplication of the frequency originally had, and resonance devices for tuning being provided in circuit with one of said windings and permitting passage of currents of several frequencies.

RUDOLF GOLDSCHMIDT.

Witnesses:
 WILHELM URBAN,
 ALBERT VENT.